United States Patent [19]

Bocko et al.

[11] Patent Number: 5,701,815
[45] Date of Patent: *Dec. 30, 1997

[54] METHOD OF PRINTING A COLOR FILTER

[75] Inventors: Peter L. Bocko, Painted Post, N.Y.; Bernard A. Eid, Champange/Seine, France; Ronald E. Johnson, Tioga, Pa.; William E. Lock, Horseheads; Robert D. Shoup, Hammonsport, both of N.Y.; Jean-Pierre Themont, Montigny Sur Loing, France

[73] Assignee: Corning Incorporated, Corning, N.Y.

[ * ] Notice: The term of this patent shall not extend beyond the expiration date of Pat. No. 5,544,582.

[21] Appl. No.: 599,503

[22] Filed: Jan. 25, 1996

Related U.S. Application Data

[63] Continuation of Ser. No. 197,141, Feb. 16, 1994, Pat. No. 5,544,582, which is a continuation-in-part of Ser. No. 145,155, Nov. 3, 1993, Pat. No. 5,535,673, and Ser. No. 145,244, Nov. 3, 1993, Pat. No. 5,533,447.

[51] Int. Cl.$^6$ .............................. B41M 1/20; B41M 1/34
[52] U.S. Cl. ...................... 101/211; 101/34; 101/35; 101/151; 101/170; 101/175; 101/424.1; 101/483; 156/240; 156/277; 427/165; 427/287; 427/511
[58] Field of Search ...................... 101/33–36, 38.1, 101/41, 150–154, 163, 170, 171, 175, 176, 211, 217, 424.1, 450.1, 483, 487, 488, 491–493, DIG. 43; 156/235, 240, 277; 427/162, 165, 266, 287, 511

[56] References Cited

U.S. PATENT DOCUMENTS

| | | | |
|---|---|---|---|
| 1,499,997 | 7/1924 | Ormond | 101/251 |
| 2,818,016 | 12/1957 | Alessi, Jr. et al. | 101/216 |
| 3,420,170 | 1/1969 | Smith | 101/211 |
| 3,443,515 | 5/1969 | Smith et al. | 101/170 |
| 4,035,214 | 7/1977 | Shuppert et al. | 156/240 |
| 4,209,551 | 6/1980 | Masaki et al. | 101/150 |
| 4,445,432 | 5/1984 | Ford, Jr. et al. | 101/152 |
| 4,549,928 | 10/1985 | Blanding et al. | 156/660 |
| 4,885,992 | 12/1989 | Duce | 101/38.1 |
| 4,965,242 | 10/1990 | DeBoer et al. | 503/227 |
| 5,069,733 | 12/1991 | Nill et al. | 156/67 |
| 5,127,330 | 7/1992 | Okazaki et al. | 101/491 |
| 5,514,503 | 5/1996 | Evans et al. | 430/7 |
| 5,533,447 | 7/1996 | Johnson et al. | 101/211 |
| 5,535,673 | 7/1996 | Bocko et al. | 101/211 |
| 5,540,147 | 7/1996 | Johnson | 101/211 |
| 5,544,582 | 8/1996 | Bocko et al. | 101/211 |

FOREIGN PATENT DOCUMENTS

| | | |
|---|---|---|
| 0082693 | 6/1983 | European Pat. Off. |
| 0186710 | 7/1986 | European Pat. Off. |
| 0286848 | 10/1988 | European Pat. Off. |
| 426144 | 6/1911 | France. |
| 1284446 | 1/1962 | France. |

(List continued on next page.)

OTHER PUBLICATIONS

Japanese Abstract–vol. 13, No. 263, (P–886) 19 Jun. 1989 of JP–A–01057202 (Matsushita Electric Ind. Co. Ltd.).
Japanese Abstract–vol. 12, No. 98, (M–680) (2495) 31 Mar. 1988 of JP–A–62231786 (Toppan Printing Co. Ltd.).

(List continued on next page.)

*Primary Examiner*—Stephen R. Funk
*Attorney, Agent, or Firm*—Robert L. Carlson

[57] ABSTRACT

The invention relates to methods and apparatus useful for making color filters for liquid crystal display panels. A multicolored ink pattern is deposited to a substrate while in a deformable state, flattened during the deposition process, and the deformed, more uniform shape of the printed dot is thereafter retained, preferably by curing during deposition. The transfer layer is preferably formed on a collector roll. A plurality of colored ink patterns is then transferred to the collector roll, preferably from a single pattern roll having multiple patterns thereon, to form the multicolor image that will become the color filter. This multicolored image is then transferred to the substrate.

26 Claims, 8 Drawing Sheets

FOREIGN PATENT DOCUMENTS

| | | | |
|---|---|---|---|
| 242028 | 1/1987 | Germany | 101/424.1 |
| 9012484 | 12/1990 | Germany . | |
| 284441 | 12/1986 | Japan | 101/424.1 |
| 62-280804 | 12/1987 | Japan . | |
| 62-280805 | 12/1987 | Japan . | |
| 63-106601 | 5/1988 | Japan . | |
| 1-293305 | 11/1989 | Japan . | |
| 2-175252 | 7/1990 | Japan . | |
| 2-176704 | 7/1990 | Japan . | |
| 3-61581 | 3/1991 | Japan . | |
| 4-70803 | 3/1992 | Japan . | |
| 4-175193 | 6/1992 | Japan . | |
| 4-332203 | 11/1992 | Japan . | |
| 5-88007 | 4/1993 | Japan . | |
| 5-127013 | 5/1993 | Japan . | |
| 5-147359 | 6/1993 | Japan . | |
| 6-939 | 1/1994 | Japan . | |
| 6-34808 | 2/1994 | Japan . | |
| 544884 | 5/1942 | United Kingdom . | |
| 611096 | 10/1948 | United Kingdom . | |

OTHER PUBLICATIONS

Japanese Abstract–vol. 15,NO. 391 (P–1259) 3 Oct. 1991 & JP–A–03156404 (Dainippon Printing Co. Ltd.) 4 Jul. 1991. Derwent Publications Ltd., London GB–AN 92–362125 (Fijitsu Ltd.).

Japanese Abstract–vol. 15,No. 79 (P–1170) 25 Feb. 1991 of JP–A–02297505 (Mitsumura Genshiyokuban) 10 Dec. 1990.

Japanese Abstract–vol. 17, No. 51 (P–1479) 2 Feb. 1993 of JP–A–04264502 (Matsushita Electric Ind. Co. Ltd.).

Japanese Abstract–vol. 15,No. 217 (M–1120) 4 Jun. 1991 of JP–A–03061579 (Toppan Printing Co. Ltd.) 18 Mar. 1991.

Japanese Abstract–vol. 17,NO. 286 (M–1422) 2 Jun. 1993 of JP–A–05016324 (Fuji Photo Film Co. Ltd.) 23 Jan. 1993.

Active Matrix Liquid Crystal Display–Part I: Manufacturing Process Written by William O'Mara, O'Mara & Association, Palo Alto, CA, Dec. 1991, Sold State Technology, pp. 65–70.

Color Filter for Liquid Crystal Display, Written by Ueyama, Sugiura, Swada, Tani, and Sakagawa for Semi–Semicon West 1992, International Flat Panel Display Conference, Section B pp. 41–59.

Printing Color Filter for Active Matrix Liquid Crystal Display Color Filter, written by Mizuno and Okazaki, Japanese Journal of Applied Physics vol. 30, No. 11B Nov. 1991 pp. 3313–3317.

"Low Cost Technology for Producing LCD Color Filters Transfer Print Method", K. Ikiaki, Nikkei MI, vol. 58, pp. 83–87 (90–04).

FIG. 1A - PRIOR ART

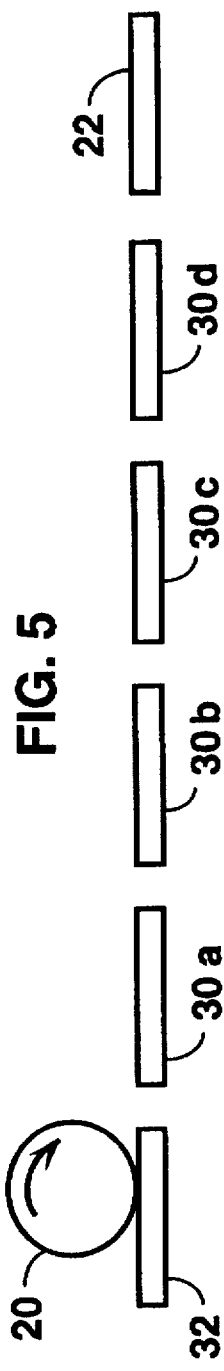
FIG. 5
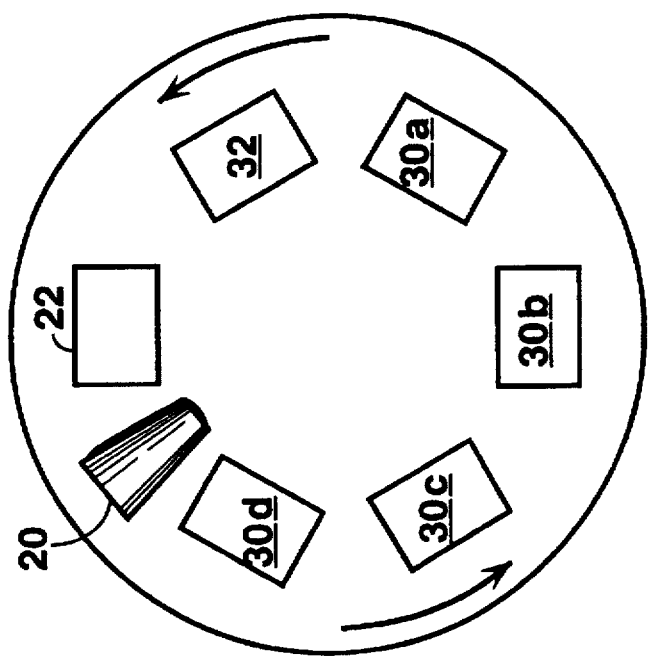
FIG. 7
FIG. 6

METHOD OF PRINTING A COLOR FILTER

This is a continuation of Ser. No. 08/197,141, filed Feb. 16, 1994, now U.S. Pat. No. 5,544,582, which is a continuation-in-part of Ser. No. 08/145,155, filed Nov. 3, 1993, now U.S. Pat. No. 5,535,673 and a continuation-in-part of Ser. No. 08/145,244, filed Nov. 3, 1993, now U.S. Pat. No. 5,533,447.

FIELD OF THE INVENTION

The invention relates to a color filter for a liquid crystal display panel, particularly an active matrix display panel, and methods for producing such a color filter.

BACKGROUND OF THE INVENTION

Liquid crystal displays (LCDs) of relatively small size have been commercially available for over two decades. Recent improvements have permitted development of large size, high resolution displays which are useful in notebook and desktop computers. Such LCD panels, particularly color LCD panels, are used for flat screen televisions, projection television systems and camcorder view finders, with many more applications anticipated in the future.

Such display panels may take two forms: passive matrix and active matrix liquid crystal displays (AMLCDs). Passive matrix displays employ transparent electrodes patterned in perpendicular striped arrays on facing glass plates. Red, green and blue color filters on the inner surface of one of the glass plates provide the full color display. The passive matrix display is thought to be easier to fabricate than AMLCDs, but much more limited in performance capabilities.

The fabrication of an active matrix liquid crystal display involves several steps. In one step, the front glass panel is prepared, which involves deposition of a color filter element onto a suitable substrate, such as glass. Color filter deposition typically involves depositing a black matrix pattern and three primary (red, green and blue) color patterns within the spaces outlined by the black matrix. The color elements are each typically about 70 to 100 microns in width by 200 to 300 microns in length for notebook computer applications, for example. The front glass substrate is completed by deposition of a transparent conducting layer over the color filter element. In a second step, a separate (rear) glass panel is used for the formation of thin film transistors or diodes, as well as metal interconnect lines. Each transistor acts as an on-off switch for an individual color pixel in the display panel. The third and final step is the assembly of the two panels, including injection of a liquid crystal material between the two panels to form the liquid crystal cell.

Ideally, in LCD displays, the transparent conducting layer, which typically is indium tin oxide (ITO), should be as smooth as possible to ensure electrical continuity. In addition, any thickness variations in the glass substrates or coatings can result in visible defects in the final display. Consequently, it is also important that the liquid crystal layer that fills the gap between the front and back panels be as uniform as possible across the entire display. Because the glass substrate which forms the front panel is itself a relatively flat article having parallel sides, any variations in thickness usually occur as a result of the process used to deposit the color filter array. It is therefore desirable to deposit color filter patterns which have a smooth upper surface and as uniform a thickness as is possible, because once a uniform thickness color filter/substrate composite has been obtained, it is a relatively straight forward process to deposit a smooth ITO layer and obtain a uniform cell gap when the front panel is combined with the rear panel. For this reason, photolithographic techniques are now preferred over printing techniques for forming color filters, because photolithography is capable of forming uniform color arrays. Nonetheless, all the deposition methods used thus far, including photolithography, by themselves have not been capable of depositing sufficiently smooth color patterns. Consequently, a planarizing layer is commonly applied over the color patterns to alleviate any imperfections in coating smoothness or thickness uniformity due to the deposition process. The transparent planarizing layer also serves to protect against ion migration to or from the ITO layer and color pattern layer. The planarizing layer should also be as smooth and flat as possible.

To facilitate deposition of a flat planarizing layer, it is desirable that the color patterns be as smooth, flat and substantially parallel to the undersurface of the glass substrate. Also, color patterns of uniform cross-section are desirable for obtaining optimum display contrast and color performance, because if the thickness of the pattern varies, the transmitted light intensity will vary.

One method heretofore used to form color filters is photolithography, in which each color pattern in the color filter is deposited in a separate step. As mentioned above, photolithography has, in the past, been a preferred method of depositing color filters, especially when compared to ink printing methods such as waterless lithography, gravure and typography, because photolithography can deposit image dots having a more flattened, rectangular cross-section, which is preferred. The printed ink dot, on the other hand, typically has a more round-topped or triangular cross-section due to surface tension effects. In addition, in typical printing processes, because the ink tends to wet both surfaces during a transfer from roll to roll or from roll to substrate, the inks tend to split cohesively to some extent during such transfers. This may further contribute to non-uniformity of the ink dot thickness, particularly for high viscosity inks. This results in an ink dot which, when deposited onto a substrate and cured, has a non-uniform cross-sectional shape, and this in turn results in an uneven surface which is more difficult to alleviate using a planarizing layer. In addition, photolithographic printing methods are inherently more accurately registered because the alignment between different color patterns is accomplished by optical rather than mechanical methods, and optical methods are intrinsically more precise. For all of these reasons, various prior workers in the flat panel display art have concluded that printing methods are substantially inferior for making color filters for LCD panels.

For example, the authors of "Color Filter for Liquid Crystal Display", by Ueyama et al., SEMI-SEMICON/West 92, International Flat Panel Display Conference, Section B, Pages 41–59, explain that, while printing methods are less expensive, the accuracy of ink printing methods is not sufficiently reliable to make high quality color filter components. The article points out, as also mentioned hereinabove, that printing methods are thought to be quite inferior in quality compared to photolithography, primarily because of the rounded cross-sectional shape of printed dots.

K. Mizuno and S. Okazaki, in The Japanese Journal of Applied Physics, Vol. 30, No. 118, November, 1991, pp. 3313–3317, proposed producing a color filter by a process wherein ink patterns are successively prepared on a transfer (offset) roll and cured by exposure to ultraviolet light (UV) prior to transfer to the substrate. Each cured ink color pattern is individually transferred to a glass substrate coated with an adhesive layer.

U.S. Pat. No. 4,445,432 discloses a method and apparatus, relevant to a different art, for applying thermoplastic decorative inks onto various substrates by printing each color ink onto a releasing surface from a heated engraved or etched metal surface, transferring the various colors from each releasing surface onto a second releasing collector surface to form a multi-colored print, and transferring the multi-colored print to a ceramic, glass-ceramic or glass substrate. Various color inks are successively printed onto a collector roll, after which the resultant pattern is transferred to the substrate. Such processes have not been used to make color filter patterns.

U.S. Pat. No. 4,549,928 (Blanding et al.) describes using a similar technique for printing phosphors and a black matrix onto color TV panels. In this operation, thermoplastic pressure-sensitive inks, corresponding to the red, green and blue color phosphors and the black matrix, are applied separately to the collector roll to form the desired pattern. This pattern is then transferred to the TV tube panel.

Unfortunately, all of the techniques described above result in the ink dots having the conventional rounded or triangular cross section. It would be desirable to develop a method which results in smoother, more uniform ink dot shapes which are more suitable for color filter array applications.

In addition, color filter arrays typically undergo rather severe heating and treatment steps during manufacture of the LCD display. For example, the transparent conducting layer, typically indium tin oxide (ITO), is usually vacuum sputtered over the color filter array panel. This commonly takes place at temperatures elevated as high as 250° C., for times which may be as long as one hour or more. Also, the liquid crystal is assembled by laminating the front and rear glass panels under pressure with thermally curable adhesives, which typically require temperatures in excess of 200° C. Not all materials can withstand such high temperatures.

The printing techniques disclosed in the '432 and '928 patents employ pressure-sensitive hot-melt inks, which are printed from heated gravure rolls. The inks cool sufficiently on the offset surfaces to develop the cohesive strength necessary to achieve 100% ink transfer between the offset surfaces and the collector roll, and between the collector roll and the substrate. In some respects, hot-melt inks are less desirable than radiation curable inks. For example, slight temperature variations in the imaging or print transfer surfaces can result in registration variability. In addition, exposure to the 200°–250° C. temperatures inherent in the sputtering operations used to deposit the transparent electrode can cause conventional hot melt inks to undergo shape deformation, oxidative degradation, or volatilization.

It would be desirable to provide high quality, uniform thickness ink color filter arrays, having good resolution and registration, which can be obtained easily and at a lower cost than prior art color filter arrays. It would also be desirable to provide color filter array elements which can withstand the heating and treatment steps employed in making a liquid crystal display device.

SUMMARY OF THE INVENTION

The present invention relates to color filters for liquid crystal displays, and methods and apparatus which are useful in manufacturing such color filters.

In one aspect of the present invention, inks are used to form the color filter and, while still in a plastically deformable state, the inks are compressed to increase the thickness uniformity of the printed ink dot. Consequently, the ink dot will achieve a smoother, more flat-topped, uniform thickness and cross-sectional shape. This smoother, more uniform thickness can be retained using a variety of techniques, such as curing the ink during the compression operation, utilizing a protective transfer layer, or both, as will be explained below.

In one aspect of the invention, the compression deformation takes place during transfer of a multicolored color filter image to the substrate. Preferably, the ink is cured simultaneous with the compression transfer to the substrate. Such simultaneous curing can be achieved, for example, by utilizing radiation curable inks and emitting radiation through a transparent process roll (or the transparent substrate), or by emitting the radiation at the point of transfer, such as at the nip formed by a transfer roll and the substrate.

The present invention also relates to a method for making a color filter comprising: providing a transparent transfer layer; depositing a plurality of colored ink patterns onto the transfer layer to form a color pattern/transfer layer composite, the ink patterns being of a sufficient viscosity to deform; and transferring the composite to a substrate such that the color ink patterns contact the substrate, and during the transferring step, the ink patterns are deformed to a smoother, more uniform film thickness than was present prior to the transfer. In this way, the ink is deposited so that it contacts the substrate directly. Consequently, the colored ink surface which contacts the substrate will conform to the substrate surface. If the substrate is flat, the surface of the ink which contacts the substrate will also be flat. The deforming step preferably takes place during and simultaneous with the transferring step. Retention of the flattened or smoothed surface is preferably facilitated by curing the ink simultaneous to the compression transferring step.

Another aspect of the present invention relates to a method of making a color filter for liquid crystal displays, comprising depositing a multicolored thermoplastic ink pattern to a transparent substrate in a Single deposition step, said multicolored ink pattern being permanently deformable during said deposition; and increasing the viscosity or cohesiveness of said ink pattern. The viscosity or cohesiveness can be increased by cooling prior to and/or during deposition, such that the ink pattern transfers as an integral film. Cohesive splitting between the substrate and transfer surface can thereby be avoided. The thermoplastic ink is deformed to a smoother, more uniform thickness coating than was present prior to deposition to the substrate. This deformation preferably takes place via compression transfer to the substrate. The flattened shape is preferably retained by further cooling during or after deposition to the substrate. More preferably, thermoplastic inks which are reactive are employed, and curing the inks during or after deposition to the substrate.

The invention also relates to a method of making a color filter for liquid crystal displays, comprising: depositing a multicolored radiation curable ink pattern to a transparent substrate in one deposition step; and increasing the viscosity, or cohesiveness, of the ink pattern. The viscosity, or cohesiveness, can be increased via radiation curing exposure prior to and/or during deposition such that the ink pattern transfers as an integral film. Cohesive splitting between the substrate and transfer surface can thereby be avoided. Final curing preferably takes place during the deposition to the substrate.

Another aspect of the present invention relates to a method for making a color filter comprising rolling a collector roll over a plurality of pattern producing surfaces or plates seriatim, at least some of the pattern producing surfaces or plates having different colored inks thereon, thereby forming a multicolored ink pattern on the collector roll; and transferring the multicolored pattern to a substrate. The pattern plates may be of the raised surface type (such as typographic), recessed surface type (such as gravure or waterless lithographic), essentially flat (such as typical lithographic processes), or any other imaging plate or combination thereof used for printing, so long as they are capable of forming ink patterns for transfer to the collector roll. The collector roll can be cylindrical, in which case the pattern plates may be located in-line on a table, or on the periphery of a rotating table, the plates being indexed to the cylinder seriatim. The collector roll can also be conically shaped, and the pattern plates disposed around a table, the table or the collector roll being moved in relation to one another to roll the collector roll over the plates seriatim.

Another aspect of the invention relates to a method for forming color filters comprising: providing a pattern roll capable of forming ink patterns; inking the pattern roll with a plurality of colored inks; and transferring the colored inks from the pattern roll to a substrate.

Another aspect of the invention relates to a method for forming color filters comprising: providing a pattern roll capable of forming ink patterns; inking the pattern roll with a plurality of colored inks; transferring the colored inks from the pattern roll to a collector roll to form at least one multicolored ink pattern; and transferring said at least one multicolored ink pattern from the collector roll to a substrate. Like the pattern plates discussed above, the pattern roll can be any type of pattern roll capable of selectively receiving ink from an inking roll to form an ink pattern. Thus, the pattern roll may have, for example, raised patterns (as in the case of typographic processes) or recessed patterns (as in gravure or waterless lithographic processes), or the pattern roll may be flat and tailored to receive ink in selected areas (as in the case of planographic lithography). Preferably, a transfer layer is applied to the collector roll prior to receiving the colored ink patterns, and the transfer layer and colored ink patterns are both transferred to the substrate so that the ink patterns contact the substrate.

The invention also relates to a printing apparatus for making color filters, comprising a pattern roll capable of producing a plurality of ink patterns. Each of the patterns on the pattern roll corresponds to a different color for the color filter array. A plurality of inking rolls are disposed around the pattern roll for applying ink to the pattern roll, and a collector roll is located adjacent the pattern roll for receiving different colored inks from the pattern roll to form at least one multicolored ink pattern.

In a preferred embodiment for making color filters for liquid crystal displays, each of the separate patterns on the pattern roll receives a separate colored ink from respective inking rolls having different colored inks. The different colored patterns are then applied seriatim to the collector roll to form multicolored ink patterns. Preferably, a transparent transfer layer is applied to the collector roll prior to receiving the colored inks, to aid in deformation of the ink dots during transfer to the substrate. Such transparent transfer layers are preferably chosen from materials which demonstrate good wetability from the inks being utilized. Preferably, the transfer layer is applied to the collector roll in a uniform thickness coating and immediately cured to retain the uniform thickness. In a preferred embodiment, for producing color filter arrays for liquid crystal applications, the collector roll is capable of receiving multiple multicolored patterns.

Another aspect of the present invention relates to color filters made using the methods and apparatus described above. By flattening out the ink dot pattern, such as occurs during a compression transfer to the substrate, the color filter layer will have a substantially uniform thickness, smoother and more uniform than was previously thought possible using ink printing techniques. As a consequence, the distance from the top of the planarizing layer to the bottom of the substrate will also be more uniform across the entire color filter.

The present invention also relates to a color filter comprising a transparent conducting layer, such as ITO, deposited directly onto the color filter layer. Because the methods of the present invention are capable of depositing very uniform film thickness color filter arrays, the transparent conducting layer may in some cases be deposited directly onto the color filter array.

Another aspect of the present invention relates to a color filter layer component consisting essentially of: a cured color filter layer having a substantially uniform layer of color patterns. This may be an infinite roll of material. Alternatively, the color filter layer component may consist essentially of a transparent support material having a cured color filter layer thereon, said color filter layer having a substantially uniform layer of color patterns. Such components may be manufactured in one manufacturing operation, and attached to a suitable substrate using a suitable adhesive at a later time.

The methods and apparatus encompassed by the above-described aspects of the present invention have numerous advantages over prior art systems for making color filters. For example, registration of multicolored ink patterns onto a substrate is facilitated by depositing such multicolored ink patterns in a single deposition step.

By utilizing printing techniques and deforming the ink dot to a more uniform thickness, such as can be achieved by compressing the ink simultaneous with transfer to the substrate, printing methods can be utilized to deposit uniform thickness color dot patterns. Maintaining the uniform thickness achieved by the deformation can be facilitated by curing the ink simultaneous with, or soon after (as in the case of reactive hot melt thermoplastic inks) transfer of the ink to the substrate. Maintaining the uniform thickness can also be facilitated by depositing the multicolored ink pattern onto a transfer layer to form a transfer layer/ink pattern composite, and transferring the composite to the substrate such that the ink pattern contacts the substrate. Consequently, the ink is sandwiched between the transfer layer and substrate and will achieve a more flat-topped, uniform thickness cross-sectional shape. The transfer layer is also advantageous in that it acts as a planarizing layer. However, unlike typical processes, wherein the planarizing process is applied during a subsequent deposition step, in this aspect of the present invention, no subsequent step is needed.

Using the multi-pattern print roll apparatus described hereinabove, increased accuracy in registration is achieved. The printing process may be further facilitated by mounting the particular printing apparatus vertically, that is, with the axis of the print rolls supported on end.

In view of all of the above, ink printing techniques can now be used to deposit color filter patterns which compete with the quality and accuracy of photolithographic techniques,. while avoiding the great expense and complexity involved with photolithographic techniques. Other advantages will become clear to those skilled in the art from the detailed description below.

BRIEF DESCRIPTION OF THE DRAWINGS

FIGS. 1A–1C are schematic views illustrating printed ink dot cross-sections of the prior art and the present invention.

FIG. 5 is a schematic view of a printing apparatus for applying multicolored ink patterns in accordance with the present invention, in which a cylindrical collector roll is moved over pattern plates.

FIG. 6 is a schematic view of a printing apparatus for applying multicolored ink patterns in accordance with the present invention, in which a cylindrical collector roll is moved over pattern plates arranged in a circular path on a table.

FIG. 7 is a schematic view of a printing apparatus for applying multicolored ink patterns in accordance with the present invention, in which a conical collector roll is moved over pattern plates arranged in a circular path on a table.

DETAILED DESCRIPTION OF THE INVENTION

The present invention relates to a variety of methods and apparatus for producing and printing ink patterns of improved quality for color filters for liquid crystal display systems. The printed inks are deformed, or flattened, to a smoother, more uniform thickness cross section than has been possible using prior art methods.

Figure 1B:
Figure 1B:
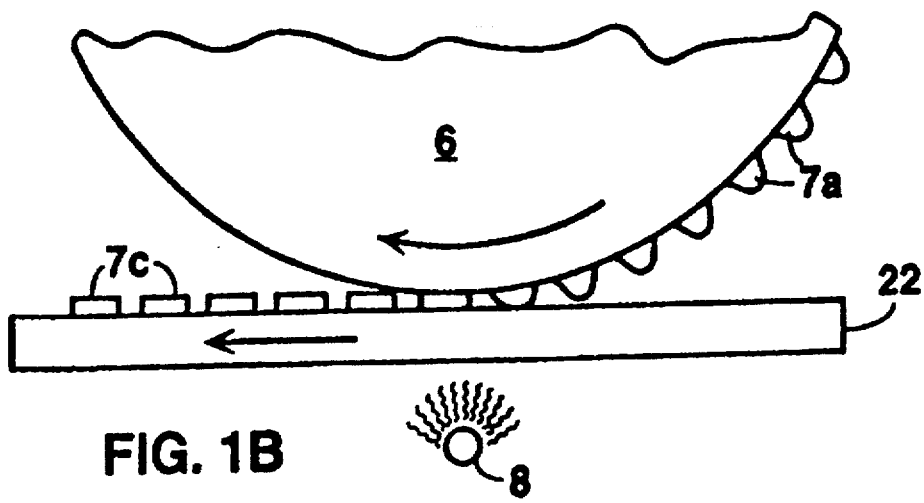

Ink printing processes typically utilize relatively smooth surfaced offset transfer rolls (i.e. not capable of producing ink patterns) which receive an ink pattern from a pattern roll. A pattern roll is a roll capable of producing an ink pattern, such as by selectively receiving ink from an inking roll, and may be, for example, a gravure, typographic, rotary screen, lithographic, waterless lithographic, or flexographic roll. When the ink is initially deposited onto a transfer roll 6 from a pattern roll, each ink dot will have a rounded or triangular cross-section, as illustrated by ink dot 7a in FIGS. 1B and 1C. Conventional printing operations result in a dot shape on the substrate having a cross-sectional shape similar to that illustrated by ink dot 7b in FIG. 1A. In the present invention, the ink is compressed, while it is still plastically deformable, to result in a flattening of the triangular cross-sectional shape, i.e., a dot having a smoother, more uniform thickness and a flat top, as illustrated by ink dots 7c in FIGS. 1b and 1c. Using this technique, the thickness uniformity of the ink color dots which make the color filter array can be greatly improved.

In addition to being deformed, the ink should be sufficiently hardened during transfer, or soon thereafter, to permanently retain the flattened ink dot shape. This can be achieved, for example, by utilizing radiation curable inks and curing the ink simultaneous with the compression transfer at curing station 8. Radiation curable inks are typically curable by UV (typically about 200–400 nm), or visible light (about 400–700 nm).

Figure 1C:
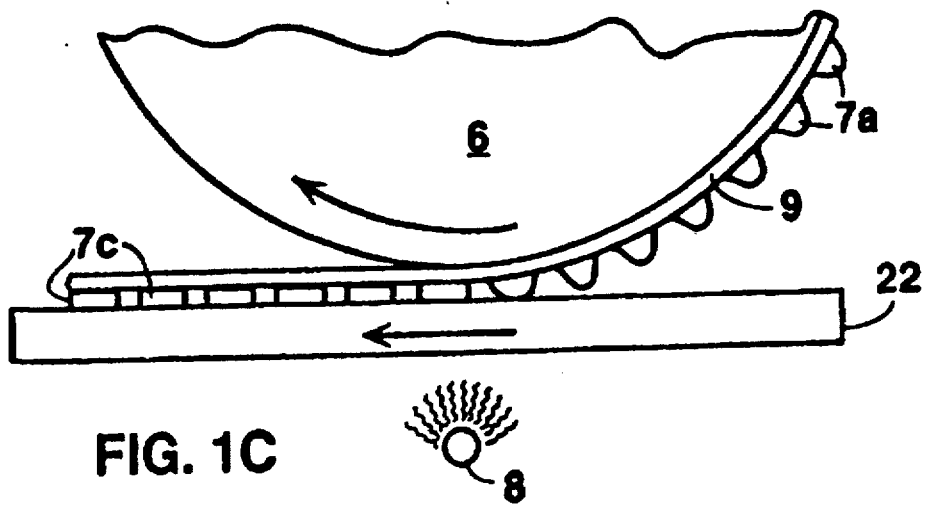

In another embodiment, illustrated in FIG. 1C, the ink dot flattening process is aided by first forming a transparent transfer layer 9 on a suitable surface, which in FIG. 1C is a collector roll, after which the multicolored ink color filter pattern is deposited onto the transparent transfer layer 9. In a preferred embodiment, transparent transfer layer 9 is composed of radiation curable material, and is cured on the collector roll prior to receiving the inks which make up the multicolored pattern. The multicolor array is then deformed by sandwiching the ink between transfer layer 9 and the substrate. Thus, the transfer layer is applied, along with the multicolored ink pattern, to the substrate 22, such that the multicolored ink directly contacts the substrate surface. In this way, the soft, deformable ink dots are squeezed between two smooth, hard surfaces. The transfer layer greatly facilitates retaining the flattened ink dot shape caused by the compression transfer, because the transfer layer covers the multicolored ink pattern after deposition to the substrate. Also, because the transfer layer covers the ink dots, it also serves as a planarizing or protective layer. In this regard, the present invention is contrary to the prior art, which deposited color filter arrays onto a substrate first, followed by a planarizing layer in a subsequent process step. Preferably, the ink dots 7 are cured simultaneous with the compression transfer at curing station 8.

The transfer layer is deposited onto a transfer roll or transfer pad as a thin film, typically less than 10 microns. Materials useful for the transfer layer include those conventionally used for planarizing layers, but also include polymers such as aliphatic polyurethanes, methacrylates, acrylates, epoxies, polyesters and so forth. A preferred material for the transfer layer is a radiation curable acrylate material, such as a radiation curable epoxy acrylate. Alternatively, the transfer layer may be in the form of a relatively hard surfaced substrate, such as, for example, a thermoset or thermoplastic polymer layer or even a glass. Of course, if print rolls are to be used to deposit the multicolored film, such hard surfaced substrates should be relatively flexible. One such material is glass microsheet, which can typically be from about 0.03 to about 0.14 mm thick. Thus, for example, each of the different colored ink patterns may be applied to one sheet of glass to form a multicolored image, and this image may then be contacted with another sheet of glass, to form a color array sandwiched between two glass sheets, one sheet acting as a substrate, the other sheet acting as a protective or planarizing layer.

Figure 2:
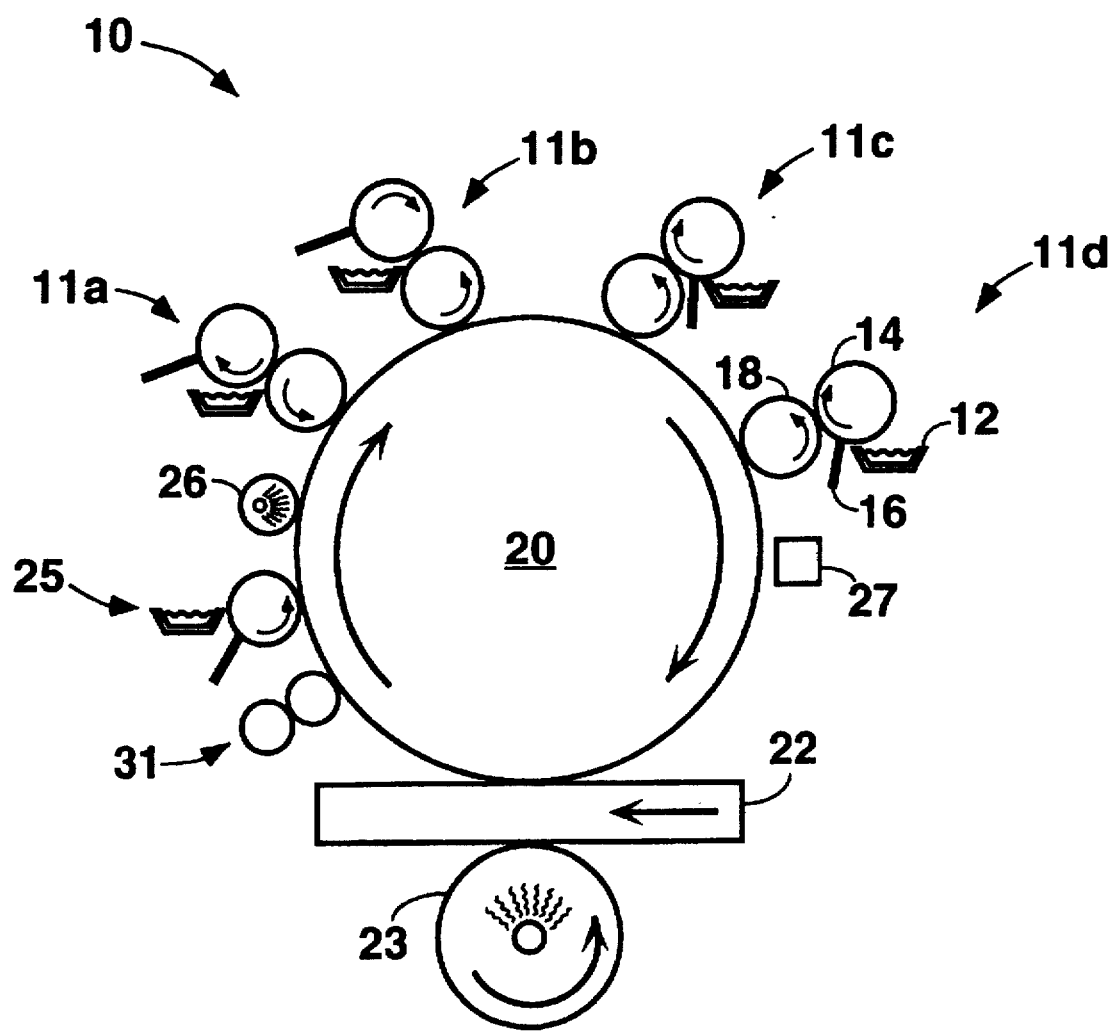
FIG. 2 is a schematic view of an apparatus for applying multicolored ink patterns to a substrate in accordance with the present invention.

FIG. 2 of the drawings is a schematic illustration of an ink printing apparatus 10 for printing color filter arrays for liquid crystal display devices in accordance with one aspect of the present invention. As illustrated, apparatus 10 has four ink application stations 11. Three of the stations (11b, 11c, and 11d) provide the basic red, green and blue color dots, and one station (11a) provides the black matrix which surrounds the color dots.

As illustrated, ink applicating stations 11a–11d each include a supply of ink 12; a heated gravure roll 14 with a patterned surface; an offset transfer roll 18; and a doctor blade 16. Alternatively, instead of gravure rolls 14 and offset transfer rolls 18, typographic or flexographic pattern rolls, together with their appropriate inking rolls may be employed, as well as more or less ink applicating stations, as desired. Each gravure pattern roll 14 has a particular pattern engraved thereon. The pattern on each gravure roll is designed to result in the desired pattern for the particular color dot in the color filter.

At each ink applicating station 11, ink is applied to the gravure roll 14 and doctored by blade 16. Each color pattern is then carried into intimate contact with its corresponding transfer roll 18, thereby transferring a colored ink pattern to transfer roll 18. The color pattern on each transfer roll 18 is then brought into contact with collector roll 20. There, the ink patterns are transferred from each transfer roll 18 to collector 20. Preferably, when gravure-type rolls are employed, as illustrated in FIG. 2, inks having hot melt pressure-sensitive adhesive characteristics are employed, so that, for example, when ink station 11a deposits the black matrix on collector roll 20, the black matrix pattern is hard enough that it is not transferred back to subsequent transfer rolls 18. Of course, radiation curable inks could be employed, in which case such inks would have to be partially cured to prevent transfer back to subsequent transfer rolls.

Ink applicating stations 11a, 11b, 11c, and 11d deposit their respective black matrix and ink color patterns onto collector roll 20 seriatim, thereby forming a multicolored ink pattern on collector roll 20. Substrate 22 is then brought into contact with collector roll 20 and the multicolored ink pattern is transferred to substrate 22 in a single transfer step. In this way, there is only one registration, between the collector roll and substrate, needed for deposition of the multicolored ink pattern and black matrix to the substrate. This is unlike prior art methods which typically deposit the color filter pattern to the substrate in four different depositions, and therefore require four separate registrations with the substrate.

There are several advantages to transferring a complete multicolored pattern in one step. First, because only one registration is needed to deposit the multicolored ink pattern from the collector roll to the substrate, accurate registration of the color filter with the substrate is facilitated. In addition, the entire multicolored image can be inspected for defects prior to the transfer.

In the embodiment illustrated in FIG. 2, for example, the multicolored image is inspected at inspection station 27, which may employ, for example, an image analysis or laser scanning type inspection system. If, upon inspection, the multicolored image passes the criteria for a suitable color filter, the substrate is moved into contact with the collector roll and the multicolored image is deposited onto the substrate. If the multicolored pattern does not pass inspection, it is not contacted with a substrate, and the ink pattern is cleaned from the rolls at a suitable cleaning station, such as cleaning roll 31. Because substrate materials utilized for liquid crystal displays are quite expensive, the capability to inspect the multicolored pattern, prior to transfer to the substrate, has the potential to generate a substantial cost savings.

Figure 2A:
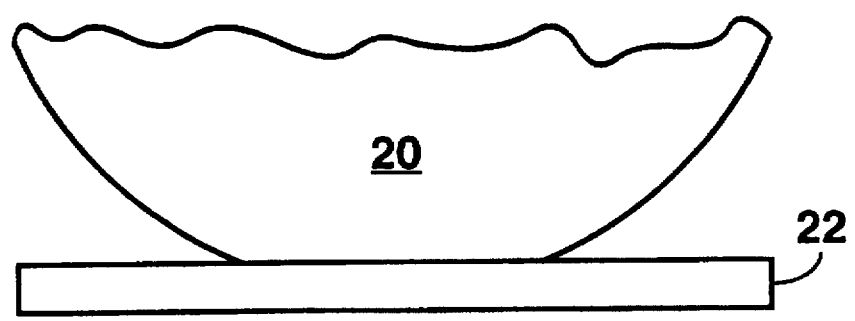
FIG. 2A is an enlarged view of the contact area between the collector roll and substrate in FIG. 2.

Preferably, the deposition of the multicolor array occurs under a compression transfer from the collector roll 20 to the substrate 22. As mentioned above, the more uniform dot shape created by the compression transfer is preferably retained by curing the ink simultaneous with the compression transfer. Thus, for such embodiments, the ink is formulated to be radiation curable, regardless of whether the ink also has hot melt thermoplastic properties in the uncured (uncross-linked) state. In the embodiment illustrated in FIG. 2, curing station 23 is a transparent roll 23 capable of transmitting radiation which is suitable for curing the particular ink employed. For example, curing roll 23 could have an ultraviolet (200–400 μm) or visible (400–700 μm) radiation source therein, and thereby be capable of emitting ultraviolet or visible radiation. Thus, the roll at curing station 23, or alternatively collector roll 20, maybe constructed with a transparent glass or plastic outer shell, and covered with a layer of clear silicone. This allows the curing radiation to reach the ink. Alternatively, the ink can be exposed to the radiation by emitting the radiation from outside the rolls, such as aiming the radiation at the nip formed by the roll and the substrate. While such curing may be done by radiation curing using conventional radiation emitting lamps, alternatively a laser could be used, guided by mirrors, to cure (crosslink) the ink sufficiently. In order for the dot to be cured in the deformed state by curing roll 23 during deposition to the substrate, the surface area of the contact area between the collector roll and the substrate must be large enough, for a particularly roll rotation speed, to allow for an appropriate amount of curing while the dot is still being compressed in a flattened state, as illustrated by the flattened section in FIG. 2A (shown exaggerated for purposes of illustration). This contact area, called the "foot", is typically about a 5 to 25 mm long contact area on the glass.

As mentioned above, in a preferred embodiment, to further facilitate retaining the flattened shape of the ink dot, a transfer layer, as was described above for FIG. 1C, may be employed. For example, in FIG. 2, a transfer layer applicator roll 25 applies a relatively uniform thickness transparent transfer layer to collector roll 20 prior to receiving the multicolored ink pattern. The transparent transfer layer is cured at curing station 26 directly after application to the collector roll. As illustrated in FIG. 2, curing station 26 is in the form of a curing roll 26, similar to curing roll 23. In addition to curing, roll 26 can be utilized to further smooth and flatten the transfer layer to a uniform thickness, if needed. Curing station 26 may employ ultraviolet, infrared, or other radiation, depending on the material employed for the transfer layer. If the transfer layer is sufficiently smooth, as deposited onto the collector roll, curing station 26 can simply be a conventional radiation emitting lamp. After curing, the multicolored ink pattern is applied to the transfer layer. The transfer layer is then applied, along with the multicolored ink pattern, to substrate 22, as best illustrated in FIG. 1C. While the transfer layer in FIG. 1C is deposited on collector roll 20, as mentioned above, it may alternatively be formed on another suitable transfer surface, such as a transfer pad, or alternatively the transfer layer may be in the form of a substrate having a hard surface, such as, for example, a plastic or glass sheet.

Preferably, the multicolored ink pattern is cured simultaneous with a compression transfer to the substrate. Alternatively, by utilizing the transfer layer described above to deposit the inks to a substrate, final hardening or curing of the inks may take place after the transfer of the multicolored pattern to the substrate. Hot melt thermoplastic or radiation curable inks may be employed, so long as they may withstand the effects of subsequent treatment steps, such as high temperature sputtering and so forth. If thermoplastic inks are employed, they should preferably have a low enough viscosity to suitably deform during transfer, and yet be sufficiently viscous to retain the flattened shape after transfer. Thus, for example, the hot melt ink may be chosen so that it is sufficiently fluid to be deformed during the compression transfer, but also sufficiently viscous that the deformation can be permanently retained by removing an amount of heat sufficient to solidify the ink soon after deposition. The rigid transfer layer would maintain the shape of the ink dot until solidification took place. In order to withstand the effects of subsequent treatment steps, such as high temperature sputtering and so forth, it is preferable that the inks employed should preferably be cross-linkable via curing, such as in the case of radiation curable inks or reactive hot melt inks. Hot-melt inks are typically printed from heated gravure rolls, and sufficiently cooled on the offset transfer surface to develop sufficient cohesive strength to achieve 100% ink transfer both between offset surfaces, and between the collector roll and the substrate.

Color filters typically require approximately 15–25 micron width black matrix lines which are less than 2 microns thick (in some cases less than 0.5 microns thick), and small color dots which are typically on the order of about 70–100 microns in width by 200 to 300 microns in length. The color dots are typically printed in films less than about 10 microns thick, and preferably less than 5 microns thick. These thin color dots must be evenly applied and accurately registered within the black matrix patterns. In carrying out the present invention, conventional radiation-curable inks are generally preferred over thermoplastic inks, partly because they can be printed at lower viscosities, which helps in printing such thin dots. Also, it is more difficult to control the pattern registration of hot melt thermoplastic inks, as they require extremely tight thermal tolerances to control pattern dimensions. In addition, radiation curable inks are easily cured during compression transfer operations in accordance with the invention. Thermoplastic inks do have at least one advantage, in that they can be formulated to set up immediately upon deposition to a substrate or transfer roll having a lower temperature, resulting in less pinholes, film non-uniformities and other such defects caused by inadequate wetting of transfer surfaces. Consequently, one preferred type of ink is an ink that displays both thermoplastic and radiation curable properties. Such an ink is one which is formulated to be thermoplastic until printed to the substrate, at which point it can be cured by exposure to appropriate radiation. By cured, it is meant that the ink is to some extent cross-linked. Cross-linking of the ink increases its durability and resistance to higher temperatures, which is preferable due to the temperatures the color filter will be exposed to in subsequent processing steps.

The inks may undergo final curing, during or after deposition to the substrate, by exposure to either radiation, thermal, moisture or other type of curing process, to achieve a hard, tack-free, durable state. There are at least two different approaches to formulating radiation-curable inks for compatibility with the collector process.

In one approach, ultra-high viscosity, radiation-curable oligomers are combined with sufficient monomer to render the material into a tacky paste with good cohesiveness. These inks can be printed from heated gravure rolls much like hot-melt inks. The cohesiveness needed for transfer between silicones, and to the glass panel, is developed by cooling on the silicone surface. Typically, viscosity increases, on average, about 10% for each °C. that the ink cools. Cohesiveness may also be enhanced in the formulations by adding compatible, relatively high viscosity, thermoplastic polymers. An example is cellulose acetate butyrate in an amount up to abut 20% by weight. Such inks may be cured during or after transfer to the glass panel by exposure to radiation. UV-light, an electron beam, or high intensity visible light, may be used, depending upon the photoinitiator employed.

Any chemical type of radiation-curable ink may be used to meet these criteria. Curing takes place during or after transfer of an ink pattern to the glass panel, although an intermediate partial cure, such as by radiant energy on the roll could be used to enhance the cohesion. Consequently, a reactive hot melt can be a free-radical type ink, a cationic type, or a hybrid of the two. It can also be a hybrid between a radiation-curable ink component and a thermal-curing ink component.

These inks may readily be formulated to develop sufficient cohesiveness on cooling to achieve 100% transfer. They can then continue to be cured to a durable, tack-free state upon the glass panel, such as by radiation exposure or thermal post-cure. With inks that are formulated to print in the manner of hot-melt inks, there is typically no curing until during or after transfer of the ink to the glass panel.

In a second approach, radiation-curable inks are printed from gravure rolls onto the transfer rolls, which are typically silicone. The ink on the transfer rolls is then exposed to radiation to achieve a tacky, partially cured state. The partial curing increases the cohesiveness to such an extent that the inks can be subsequently 100% transferred between release surfaces, as well as to the glass panel. Final curing can be accomplished by further radiation or thermal post-cure.

Inks dependent on the free-radical mechanism for curing are quite satisfactory and have the advantage of a faster printing rate. However, for curing on the first transfer roll during offset printing, cationic or hybrid inks have the advantage of a potentially broader time exposure windows for curing. Cationic or hybrid inks cure enough initially to increase cohesiveness but retain sufficient tack for subsequent transfer from the collector roll to the substrate.

Examples of radiation-curable inks which are useful in the present invention include the following four general categories: Free-radical, cationic, a hybrid of the free-radical and cationic and a hybrid based on combined radiation and thermal curing mechanisms.

Free-radical inks are characterized by a free-radical photoinitiator. Under influence of radiation, resins having acrylate and methacrylate functional groups, as well as the vinyl group in unsaturated polyester resins, can be cured using such a photoinitiator.

Cationic inks utilize different resins, primarily epoxy functional resins or vinyl ether functional resins. The epoxy formulations consist principally of epoxide, a polyol and a cationic photoinitiator, primarily triaryl sulfonium salts. The photoinitiator develops a positive charge when activated by radiation to promote curing. Curing is based on ring opening in the epoxide through action of the Bronsted acid that is produced by photolysis of a cationic photoinitiator.

Radiation-curable hybrid inks are mixtures of the cationic and free-radical formulations just discussed. These inks partially cure rapidly under light exposure via a free-radical mechanism. This is followed by a slower continuing cure via the cationic mechanism. Unlike the free-radical curing mechanism, the cationic curing mechanism does not cease curing after removal from the radiation exposure. Hybrid free-radical/cationic inks, in fact, are ideal for printing a color filter using offset gravure type machines, such as is illustrated in FIG. 2. The free-radical portion will cure rapidly upon radiation exposure, whereas the cationic portion will cure much more slowly. This allows the ink to remain tacky for a sufficient times to complete operation of the printing process. Such inks can be formulated to be curable with UV, electron beam, or high intensity visible light. However, either UV or visible light is preferred due to the ease of incorporation into the printing apparatus.

The following TABLE sets forth, in parts by weight, a typical formulation for each type of radiation-curable ink. In the TABLE, the initial column identifies the several ink components by their generic names. The second column sets forth the trade name for the particular material employed in a formulation. The further columns set forth the formulation for each ink.

In addition, a formulation will contain a suitable color pigment. Use of a dye is not precluded. However, we prefer to avoid use of dyes because of their temperature and light instability. Also, they can interfere with the curing chemistry of the radiation-curable inks, particularly for cationic inks.

The formulations in the TABLE represent inks that are believed to be suitable for employment in the present invention.

TABLE

| Ink Components | Trade Name | Free-Radical | Cationic | Free-Radical/ Cationic Hybrid |
|---|---|---|---|---|
| Epoxidized Novolac | Quatrex 2010 | — | 70 | 50 |
| Partially acrylated epoxide | Ebecryl 3605 | — | — | 35 |
| Acrylate monomer | Sartomer 351 (TMPTA) | 30 | — | 15 |
| Free-radical Photoinitiator | Darocur 4265 | 3 | — | .5 |
| Cationic Photoinitiator | UVI-6974 | — | 1.5 | 1.5 |
| Silane coupling agent | Z6040 | — | 1.75 | 1.75 |
| Fluorosurfactant | FC-430 | .25 | .25 | .25 |
| Cycloaliphatic epoxide | UVR 6105 | — | 30 | — |
| Acrylated epoxidized novolac with 20% acrylated monomer | Ebecryl 3603 | 70 | — | — |
| Silane coupling agent | A-174 | 1.75 | — | — |
| Curing synergist | Quantacure ITX | 1 | — | — |

Hybrid inks that combine radiation and thermal curing mechanisms can also be formulated for gravure type processes such as that illustrated in FIG. 2. With such ink only the radiation-curable portion is cured upon radiation exposure during the printing process as herein described. The ink is fully cured thereafter by appropriate thermal treatment to cure the thermally-curable portion of the ink.

In the past, rolls containing silicone materials have been widely utilized to deposit printed ink patterns. One potential inherent disadvantage to using silicone containing rolls occurs because of the nature of such silicone containing materials to exude silicone oil. This can be a problem in color filter applications.

Using offset gravure type printing processes, some low viscosity, light-curable inks were found to bead readily upon silicone release surfaces unless formulated to exhibit plastic flow rheology; that is, a yield point followed by shear rate dependent viscosity. To minimize this problem, it is desirable to partially cure the inks on the transfer rolls soon after their deposition thereon. It is also desirable to select materials for the rolls that have less releasing characteristics than would be employed for thermoplastic inks. Luckily, radiation-curable inks have higher cohesive strengths after partial curing, enabling satisfactory use of tighter (less releasing) silicone materials.

It is also desirable to utilize higher durometer materials for the offset rollers to minimize distortion during transfer. At the same time, they must still provide for satisfactory ink pick-up and release.

One problem in the past with printing methods is that significant rejection problems have been reported in the literature when the normally employed silicone release surfaces were utilized to produce color filters via conventional printing techniques. Typically, such silicone transfer rolls exude a trace amount of silicone oil which in turn deposits on top of the color filter. To prevent adhesion problems, this silicone oil must be cleaned off prior to depositing the planarizing layer or transparent conductive layer.

In the present invention, this problem may be solved by utilizing radiation curable inks, as the cohesive strength radiation-curable inks is normally much higher than with thermoplastic inks. Consequently, use of radiation curable inks enable the transfer and collector rolls to employ less releasing surfaces, and perhaps more importantly, non-silicone surfaces. One preferred material for use as the collector roll material which is less releasing is a fluorocarbon polymer.

One reason fluorocarbon polymers are preferred is that no silicone will be present to deposit onto the top of the printed color filter pattern. In addition, inks commonly employ low viscosity, low molecular weight materials which may be absorbed into conventional transfer surfaces, such as silicones. This absorption is commonly referred to as swelling. In contrast, fluorocarbon materials were found to be much more resistant to swelling, and yet capable of providing 100% release, particularly when using radiation-curable inks. The reason for the superior functioning of the radiation-curable inks is their higher cohesiveness after a partial cure. To attain 100% release, ink cohesion must be greater than adhesion of the ink to its releasing surface.

In addition to the nature of the collector surface, the actual structure of the collector should be such that surface distortion is minimal or non-existent. This will result if the collector exhibits a relatively rigid surface, such as a fluorocarbon film backed by an elastomer layer to allow compensation for substrate warpage. This is expected to become more critical as the glass panel size increases.

In the device illustrated in FIG. 2, the separate patterns developed by the separate gravure surfaces are printed on collector roll 20 in registration. Thus, each separate ink pattern is printed on collector roll 20 in a specific geometric relation with each of the other ink patterns. Registration is accomplished by alignment of the various transfer rolls 18 to collector roll 20. When all of the color inks and black matrix inks are printed on the collector in the proper relation, the multicolored array which makes up the color filter is established. Once established, the multicolored array is transferred completely in one step from collector roll 20 to the substrate.

Figure 3:
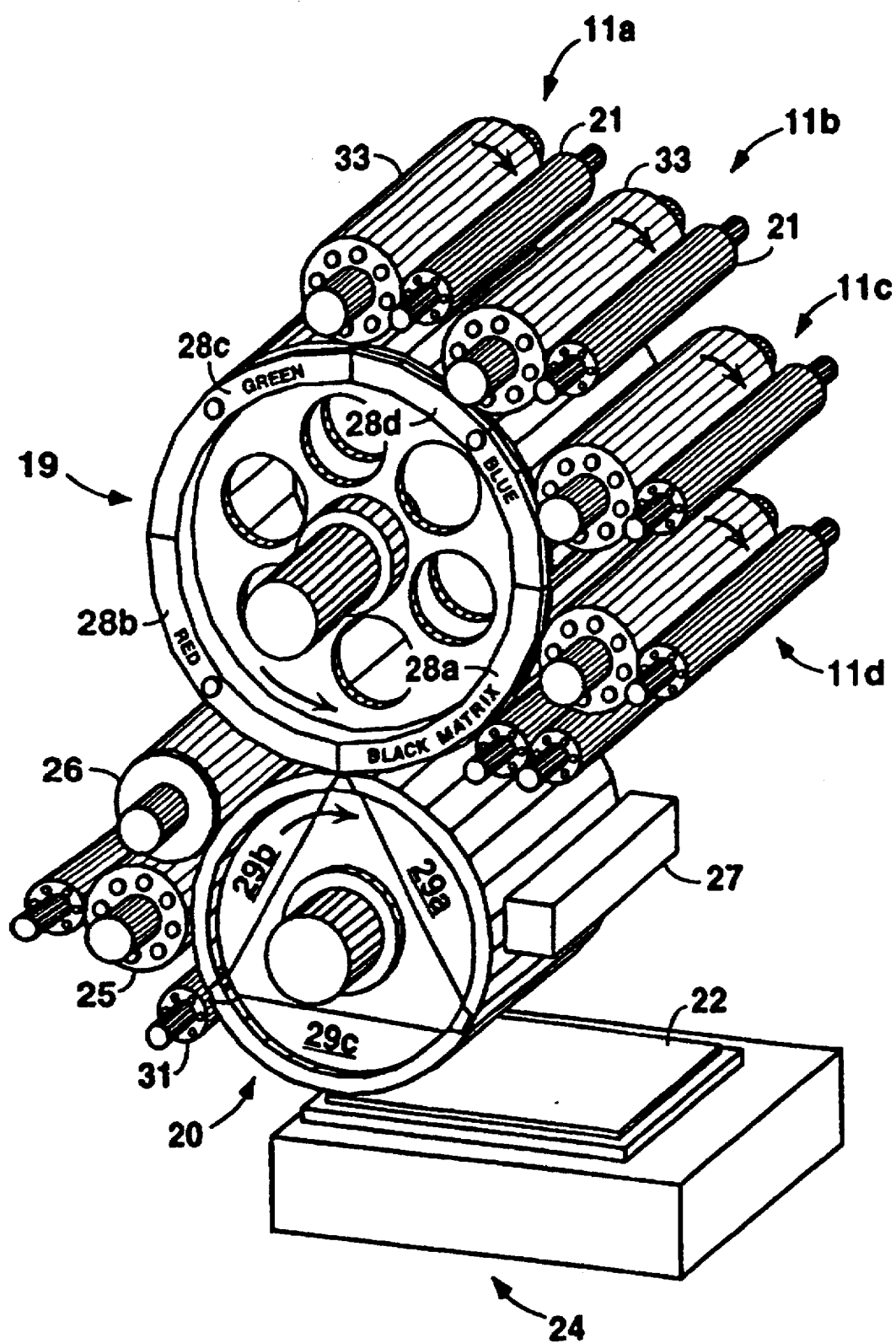
FIG. 3 is a schematic view of an alternative apparatus for applying multicolored ink patterns in accordance with the present invention.

FIG. 3 illustrates an alternative, more preferred apparatus in accordance with the present invention, especially useful for depositing an accurately registered, multicolored ink color filter pattern onto a substrate. As illustrated in FIG. 3, an image pattern roll 19, having multiple printing patterns thereon, is utilized in place of the more conventional multiple pattern and transfer roll design illustrated in FIG. 2. Pattern roll 19 may be virtually any form of roll capable of producing an ink pattern or image, including lithographic, typographic, waterless lithographic, and so forth. Preferably, pattern roll 19 is a flexographic or other type of typographic printing roll.

In the embodiment illustrated in FIG. 3, pattern roll 19 is a typographic roll having four typographic ink receiving regions 28a, 28b, 28c, and 28d thereon which receive ink and form the appropriate black matrix and the red, green, and blue color patterns. The inking stations 11 have inking rolls 33 which apply the correct colored ink from ink metering rolls 21 to each of the four quadrants of pattern roll 19. The inking rolls 33 are thus movable to and from a contacting position with pattern roll 19, so that each colored ink is applied only to its appropriate quadrant. In the embodiment of FIG. 3, quadrant 28A is patterned to receive black ink and apply the black matrix, while 28b, 28c, and 28d are patterned to apply the red, green, and blue color patterns, respectively, of the color filter array. The collector roll 20 has three receiving surfaces: 29A, 29B, and 29C.

Thus, the embodiment illustrated in FIG. 3 employs an image transfer ratio, from pattern roll 19 to collector roll 20, of 4:3. Transfer ratio is the ratio of the number of multicolored patterns on pattern roll 19 to the number of receiving surfaces on collector roll 20.

The separate ink patterns developed on pattern roll 19 are printed onto each of the receiving surfaces of collector roll 20 in registration. This means that each separate ink pattern from quadrants 28A, 28B, 28C, and 28D is printed on the collector in a specific geometric relation with each of the other ink patterns. Compared to the apparatus described in FIG. 2, registration is considerably easier using the apparatus of FIG. 3, for several reasons. First, because these are only two rolls involved, i.e., pattern roll 19 transferring to collector roll 20, there are less mechanical parts to align. Registration is further facilitated by accurately locating the individual patterns on pattern roll so that each pattern automatically registers itself to the collector roll 20, when the collector roll 20 and pattern roll 19 are accurately aligned. Thus, there is only one pattern roll to align, as opposed to multiple pattern rolls, as in FIG. 2. When all of the colored inks are printed onto collector roll 20 in proper relation, the multicolored Image which makes up the color filter is established. Once established, the multicolored image is completely transferred to the panel by the collector to the substrate in a single transfer.

Registration requirements for liquid crystal display color arrays is typically on the order of plus or minus 5 microns. Because of these extremely demanding registration requirements, a printing machine like FIG. 3, which utilizes a single pattern roll to form and deposit the various color patterns to a single collector roll, is useful for making accurately registered color filters for liquid crystal displays.

One advantage to the 4:3 image pattern transfer ratio from pattern roll 19 to collector roll 20 is that such a ratio results in the seriatim transfer of multiple images from one roll to another in which each pattern roll quadrant visits a different receiving segment on the collector roll with every rotation of the pattern roll. This results in a self-indexing process, i.e., once into a running production process, and a precise registration is achieved between all of the printing components, pattern roll 19 and collector roll 20 can be maintained in their respective positions in a matched surface speed mode of operation. This self-indexing feature further helps to maintain accurate registration.

Preferably, prior to receiving any of the black matrix or the color patterns, a transparent transfer layer is applied by application roll 25 to each of compartments 29A, 29B, and 29C. The transfer layer is preferably cured under compression by radiation emitted through smoothing roller 26.

In the embodiment illustrated in FIG. 3, pattern roll 19 has just deposited a black matrix pattern onto compartment 29A of collector roll 20. Next, quadrant 28B will deposit the red color dot pattern onto compartment 29B of collector roll 20, and quadrant 28C will deposit the green color dot pattern onto compartment 29C. On the next rotation of roll 20, quadrant 28D will deposit the blue color dot pattern onto compartment 29A, quadrant 28A will deposit a black matrix pattern onto compartment 29B, and quadrant 28B will deposit a red color dot pattern onto compartment 29C. On the next rotation of roll 20, quadrant 28C will deposit a green color dot pattern onto compartment 29A, quadrant 28D will deposit a blue color pattern onto compartment 29B, and quadrant 28A will deposit a black matrix pattern onto compartment 29C. On the next rotation of roll 20, quadrant 28B will deposit a red color dot pattern onto compartment 29A, and so forth.

At this point, a completed multicolored image is present on compartment 29A of collector roll 20. This image is then inspected at inspection station 27. If the multicolored pattern does not pass inspection, it is rejected and cleaned off of compartment 29A by cleaning roller 31. If the multicolored pattern passes inspection, the glass substrate, which is supported on vacuum chuck 24, is contacted with collector roll 20 to transfer the transfer layer and multicolor image to the substrate.

In the operational sequence outlined above, the first pattern deposited on compartments 29B and 29C of roll 20 were the red and green color dot patterns. In some cases, however, it may be desirable to deposit the black matrix patterns first. In such cases, various color patterns may be cleaned off at cleaning roller 31 as required until the black matrix pattern is the first deposited pattern on each of the compartments 29A, 29B and 29C of collector roll 20.

Alternatively, the pattern roll could be selectively inked for the initial rotations of the process. For example, in a first rotation of pattern roll 19, only the black matrix pattern 28A would be inked. On the second rotation of pattern roll 19, the blue ink pattern and the black matrix pattern would be inked. On the third rotation of pattern roll 19, the green, blue and black matrix ink patterns of pattern roll 19 would be inked, and on the fourth rotation of pattern 19, all of the pattern on pattern roll 19 would be inked. In this way, all of the compartments 29A, 29B and 29C would receive a black matrix pattern prior to receiving any of the colored ink patterns. Once the above four initial rotations were completed, all quadrants of pattern roll 19 would be inked every rotation, resulting in a continuous process in which the black matrix patterns would be deposited onto compartments 29A, 29B and 29C prior to any of the color patterns.

As explained above, transfer of the multicolored ink pattern preferably takes place while the multicolored image is still deformable. Consequently, the deformable inks can be compressed, during the transfer, between the transfer layer and the substrate 22, as illustrated in FIG. 1C. In a preferred embodiment, the ink employed is radiation curable ink, and vacuum chuck 24 is capable of emitting radiation through substrate 22, such as from an internally located radiation emitting source (not shown), to cure the ink while it is compressed and thereby retain the resultant more uniform shape of the ink dots. Alternatively, of course, a transparent chuck 24 can be employed, and the radiation necessary for curing can be emitted through chuck 24.

During deposition of the various color patterns to collector roll 20, the contacting surfaces of pattern roll 19 and collector roll 20 preferably move at the same speed to minimize "skidding" defects which can result from non-uniform speeds between contacting surfaces of the rolls. However, there are times when it may be desirable to run the pattern roll 19 and collector roll 20 in non-contacting positions at different speeds. .For example, because the rheologic behaviors of many inks change with shear rate and/or time, they may transfer best from the inking stations 11 to pattern roll 19 at one speed, while the transfer from pattern roll 19 to collector roll 20 may best occur at another speed. Such a multiple speed process is easily achieved in the apparatus illustrated in FIG. 3, by designing pattern roll 19 and collector roll 20 so that they are movable towards and away from one another. Consequently, pattern roll 19 can be run at one speed (or multiple speeds for different colors) to deposit each of the individual color inks on pattern roll 19, and then brought into contact with collector roll 20 at another speed to deposit the multicolored image onto collector roll 20.

The three image compartment collector 20 illustrated is advantageous in the sense that, while it is receiving an inked image from pattern roll 19, it can also be depositing a multicolored image onto substrate 22. Of course, instead of the 4:3 transfer ratio, other variations of pattern roll 19 and collector roll 20 may be employed. Thus, for example, collector roll 20 may be designed to receive a single complete multicolored image thereon, or some other number of multicolored images.

Figure 4:
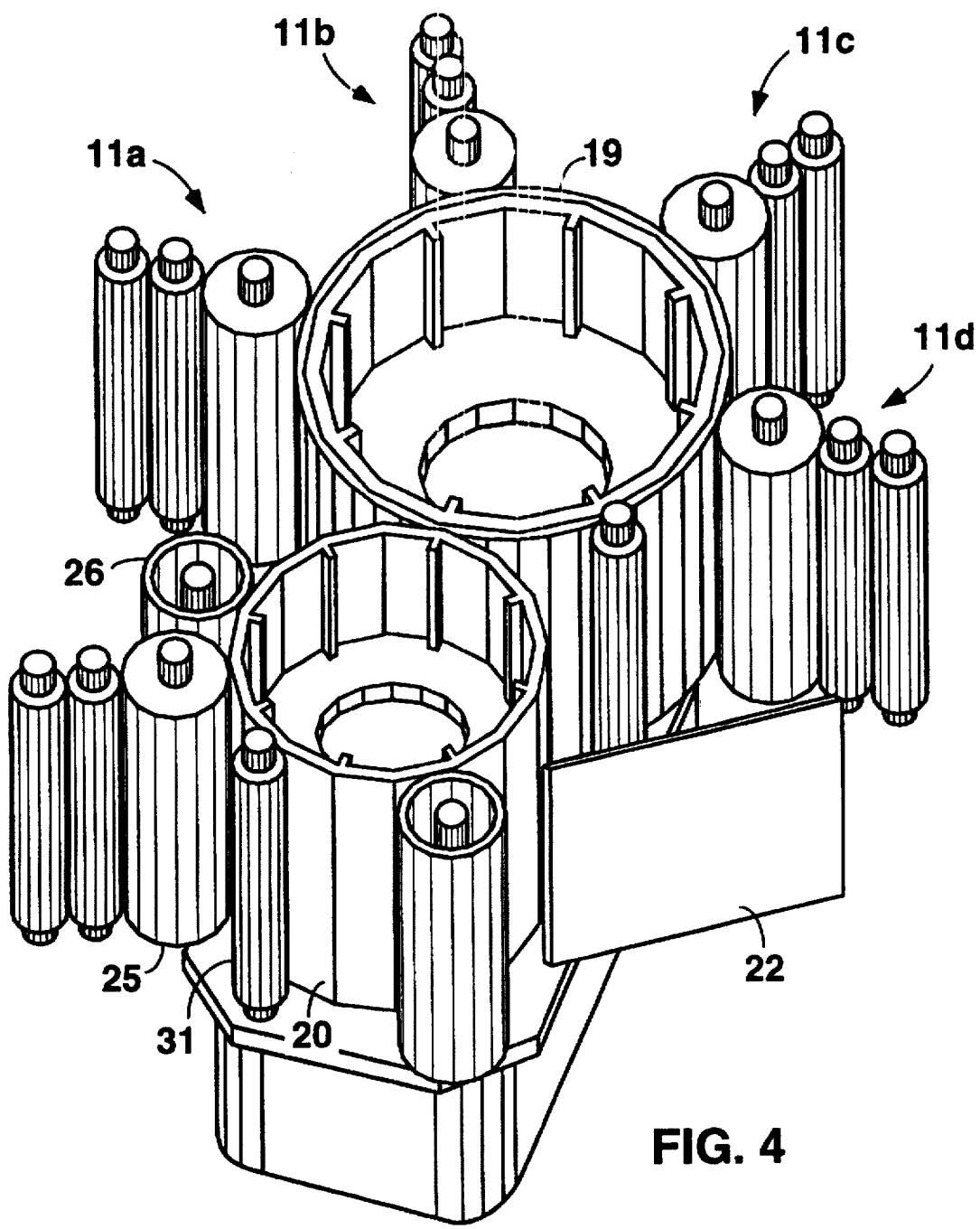
FIG. 4 is a schematic view of a vertically mounted printing apparatus for applying multicolored ink patterns in accordance with the present invention.

FIG. 4 illustrates the most preferred apparatus in accordance with the present invention, in which the printing apparatus is turned on its side, i.e., vertically mounted. By vertically mounting the printing rolls, they maybe removed vertically (in an axial direction, relative to the roll) from the printing apparatus, as opposed to conventional horizontally disposed rollers, which must be removed horizontally. The apparatus of FIG. 4 is similar in design and operation to that illustrated in FIG. 3, the major difference being each of the printing rolls are supported on end.

The idea of vertically mounting the printing rolls is not limited to apparatus such as those illustrated in FIGS. 3 and 4. Hence, vertical mounting may be employed for virtually any conventional horizontally mounted printing configuration. A number of disadvantages inherent in prior art printing devices are overcome by supporting the print rolls on end, as illustrated in FIG. 4, rather than horizontally, as is done in FIG. 3 and other conventional printing apparatus.

First, vertically mounted printing apparatus are more simple in construction, in the sense that the printing rolls can be supported by a single bearing system located beneath each print roll, rather than two (one at each end). Because this leaves the opposite end (i.e., the upper end) of each print roll free, these print rolls can be removed and replaced by moving the rolls in a vertical direction, rather than a horizontal direction, as was the case in conventional apparatus such as those illustrated in FIGS. 2 and 3. Consequently, changing print rolls is greatly facilitated. For example, collector roll 20 in FIG. 4 can be replaced by lifting and removing existing collector roll 20 and lowering a new transfer roll onto the exposed roller bearing. A top bearing may be attached to the upper end of the rolls, in which case the bearing must be removed prior to removing the roll.

The vertically mounted designs also allow for maximizing the usable space in the printing apparatus. For example, since pattern roll 19 in FIG. 3 must be removed horizontally (movement of the roll in a radial direction), the printing stations 11 are all mounted in a confined area on one side of pattern roll 19, so that the opposite side of pattern roll 19 can be accessed by removal tools. On the other hand, in FIG. 4, because rolls can be replaced by vertical lifting (movement of the rolls in an axial direction), more efficient use of space can be made.

Another advantage of vertically mounted printing apparatus such as that illustrated in FIG. 4 is that there is less deflection of rolls, due to gravity, when the print rolls are mounted vertically, compared to horizontally. This can be a large advantage in precision printing applications such as making color filters.

In one respect, it is surprising that the vertically mounted printing concept works well, as conventional wisdom would suggest that the ink would drip in an axial direction down the rolls, impairing the ink deposition thickness uniformity. However, in actuality, this is not the case. Because color dot ink patterns in color filter arrays are typically no more than 10 microns thick, preferably no more than 5 microns thick, the surface tension and theology of these relatively thin ink coatings is sufficient to retain the ink on the roll In its desired location throughout the process. In addition, in horizontal print roll devices, any dripping that occurred from the inking rolls would land on the rolls below. Because the rolls in vertical mounted apparatus are mounted vertically, any dripping that occurs merely drips out of the process.

FIG. 5 is an alternative printing apparatus, for carrying out the methods described above, in which a collector roll 20 is contacted with a plurality of separate inking pattern plates 30A, 30B, 30C, and 30D for producing the desired black matrix, red, green, and blue color patterns of the color filter. The inking pattern plates 30 impart a multicolored image onto collector roll 20, which is then transferred to substrate 22.

In a preferred embodiment, a planarizing layer is first applied via planarizing applicator plate 32 to collector roll 20 and cured thereon. The planarizing layer is then contacted with plate 30a, which deposits a black matrix layer onto the planarizing layer, then over plates 30b, 30c, and 30d, which deposit the red, green, and blue colored ink patterns.

While the colored ink patterns are still deformable, they are transferred under a deforming compression force from collector roll 20 to substrate 22. Preferably, radiation curable ink is employed, and the deformed shape of the ink dots is maintained by curing the ink during transfer to the substrate.

FIG. 6 is an alternative embodiment similar to FIG. 5, the main difference being that, instead of being arranged in-line, the inking pattern plates 30 are disposed in a circular path around a table 38.

Table 38 and collector roll 20 are moved relative to one another to expose the pattern plates 30 seriatim to the collector roll 20. For example, the table can be rotated to index the various pattern plates to collector roll 20, and collector roll 20 can then be rolled appropriately over the pattern plates (with respect to table 38, in a radial direction).

In a preferred embodiment, a planarizing layer is first applied via planarizing applicator 32 to collector roll 20 and cured thereon. The planarizing layer is then contacted with plate 30a, which deposits a black matrix layer onto the planarizing layer, then over plates 30b, 30c, and 30d, which deposit the red, green, and blue colored ink patterns.

While the colored ink patterns are still deformable, they are transferred under a deforming compression force from collector roll 20 to substrate 22. Preferably, radiation curable ink is employed, and the deformed shape of the ink dots is maintained by curing the ink during transfer to substrate 22.

FIG. 7 illustrates another alternative apparatus. FIG. 7 is similar to FIG. 6, the main difference being that, instead of utilizing a cylindrical collector roll 20, the collector roll 20 is conical in shape. The conical collector roll 20 is contacted with the various pattern plates 30 seriatim by appropriate rotation of the table.

In a preferred embodiment, a planarizing layer is first applied via planarizing applicator 32 to collector roll 20 and cured thereon. The planarizing layer is then contacted with plate 30a, which deposits a black matrix layer onto the planarizing layer, then over plates 30b, 30c, and 30d, which deposit the red, green, and blue colored ink patterns.

While the colored ink patterns are still deformable, they are transferred under a deforming compression force from collector roll 20 to substrate 22. Preferably, radiation curable ink is employed, and the deformed shape of the ink dots is maintained by curing the ink during transfer to the substrate.

Figure 8:
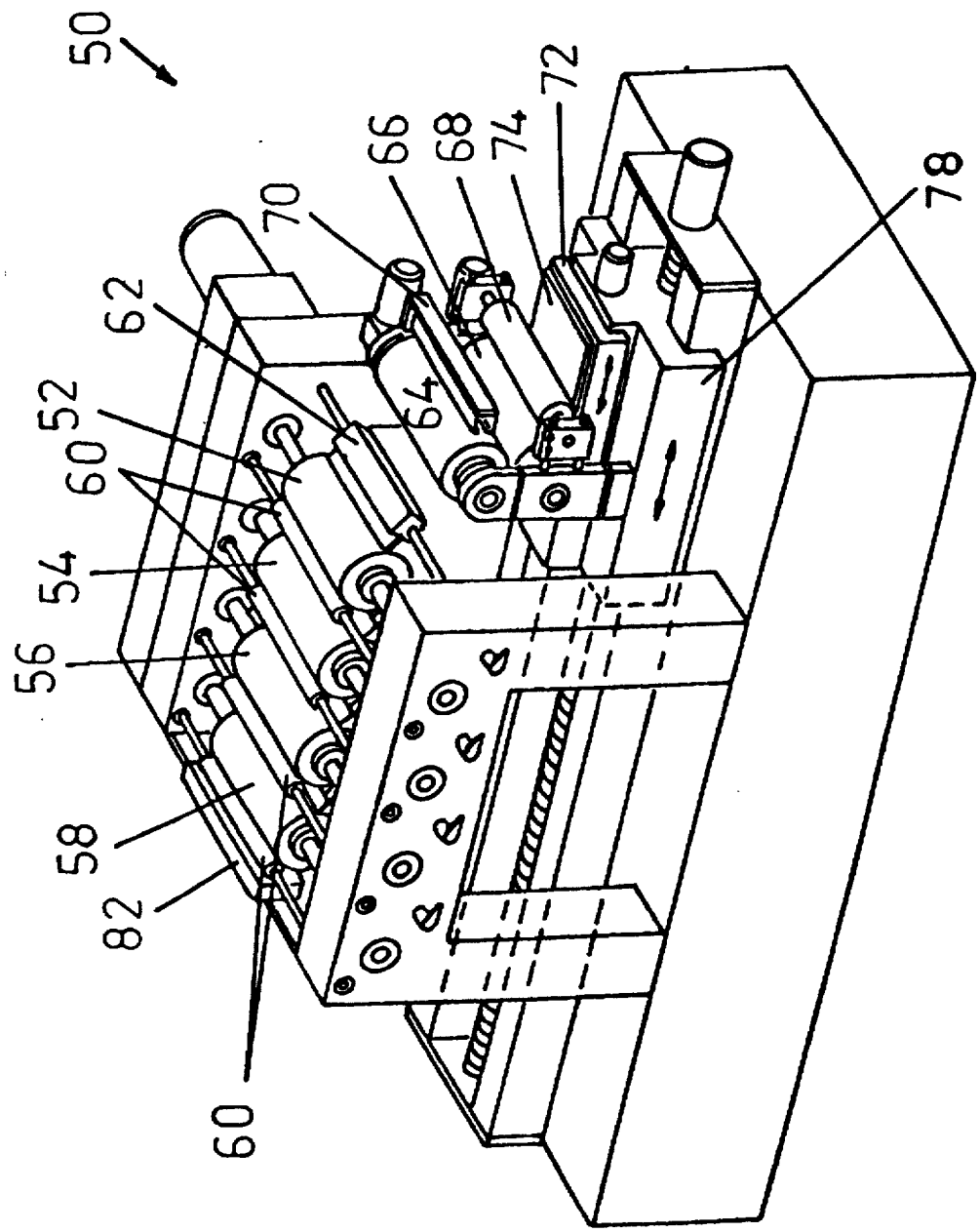
FIG. 8 is an alternative printing apparatus in accordance with the present invention.

FIG. 8 is a perspective view of an apparatus 50, which designed to apply a four-color filter on a glass substrate. Apparatus 50 embodies four rolls 52, 54, 56, and 58. Rolls 52–58 are shown as being suitably suspended, gravure type rolls. Each roll is associated with an ink source 60 and a doctor blade 62. Ink source 60 may be supplied with an appropriate colored ink in known manner.

Apparatus 50 further embodies an assembly that includes transfer roll 64, a collector roll 66, and a cleaning roll 68. Associated with roll 64 is a source of radiation 70, for example, a UV lamp. The assembly is adapted to synchronized movement in conjunction with a support slide 72 which carries a flat glass substrate 74. Slide 72 has a recessed area in its upper surface in which substrate 74 is securely held in a fixed position, for example, by a vacuum mold. Support slide 72 is carried by, and moves on, a main slide 78 mounted on a base 80.

In operation, the assembly moves slide 78 and substrate 74 so that transfer roll 64 visits roll 52 and receives a single color pattern therefrom. This pattern may be cured to a tacky state on transfer roll 64 and transferred to collector roll 66. In like manner, transfer roll 64 sequentially visits each of rolls 54, 56 and 58 to receive the unique color pattern of each roll. Each pattern is transferred to collector roll 66 to assemble a complete four-color (black matrix and red, green and blue colors) pattern for a color filter on roll 66. This pattern may then be inspected at an inspection unit 82. If rejected, the pattern may be removed by cleaning roll 68. If accepted, the complete color filter pattern is transferred from collector roll 66 to substrate 74.

Figure 9:
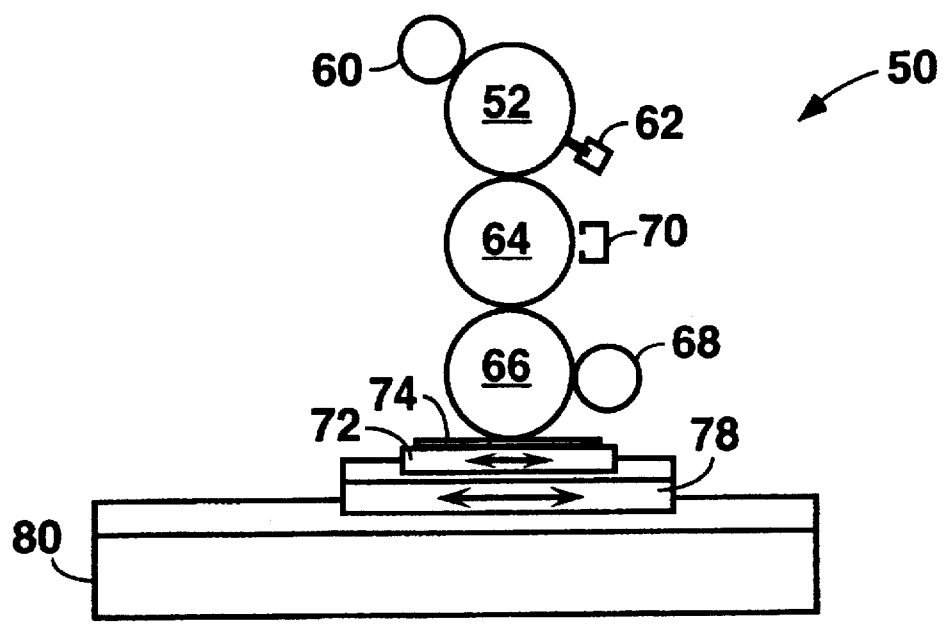
FIG. 9 is a partial side view of the printing apparatus in FIG. 8.

FIG. 9 is a partial side view of the apparatus in FIG. 8, showing the arrangement as transfer roll 64 visits roll 52 to receive the initial ink pattern for transfer to collector roll 66. It will be appreciated that this operation is repeated serially as the assembly moves along main slide 78. This permits transfer roll 64 to visit each of rolls 54, 56, and 58 and pick up an ink pattern therefrom.

While FIG. 8 shows rolls 52–58 as gravure rolls, it will be appreciated that other printing techniques, such as typographic or flexographic, may be substituted. In such cases, a different ink source might be provided, and doctor blade 62 omitted, in customary manner. Use of a gravure roll or a screening mechanism requires offset roll 64 as well as collector roll 66. Otherwise, in producing a color filter pattern, a previous color will tend to transfer back to the gravure roll or screen. A typographic roll, such as a letterpress or flexographic roll, does not require an offset roll since there is no contact, except in the print areas on the roll. Likewise, a lithographic roll does not require an offset roll since the non-print areas do not accept ink.

Also, a combination of different type rolls is contemplated. For example, in printing a color filter pattern, which involves red, green, and blue color dots within a black matrix, the black matrix might be printed initially. In that case, roll 52 might be a gravure roll. Rolls 54, 56, and 58, which would provide the three color dot patterns, might be typographic or lithographic rolls.

It is also contemplated that the initial ink patterns may be formed on traditional gravure or etch plates. While these may be heated, it is a feature of the present process, and more particularly the inks employed, that a pattern may be transferred at ambient temperature, to avoid possible registration problems due to thermal variation.

Figure 10:
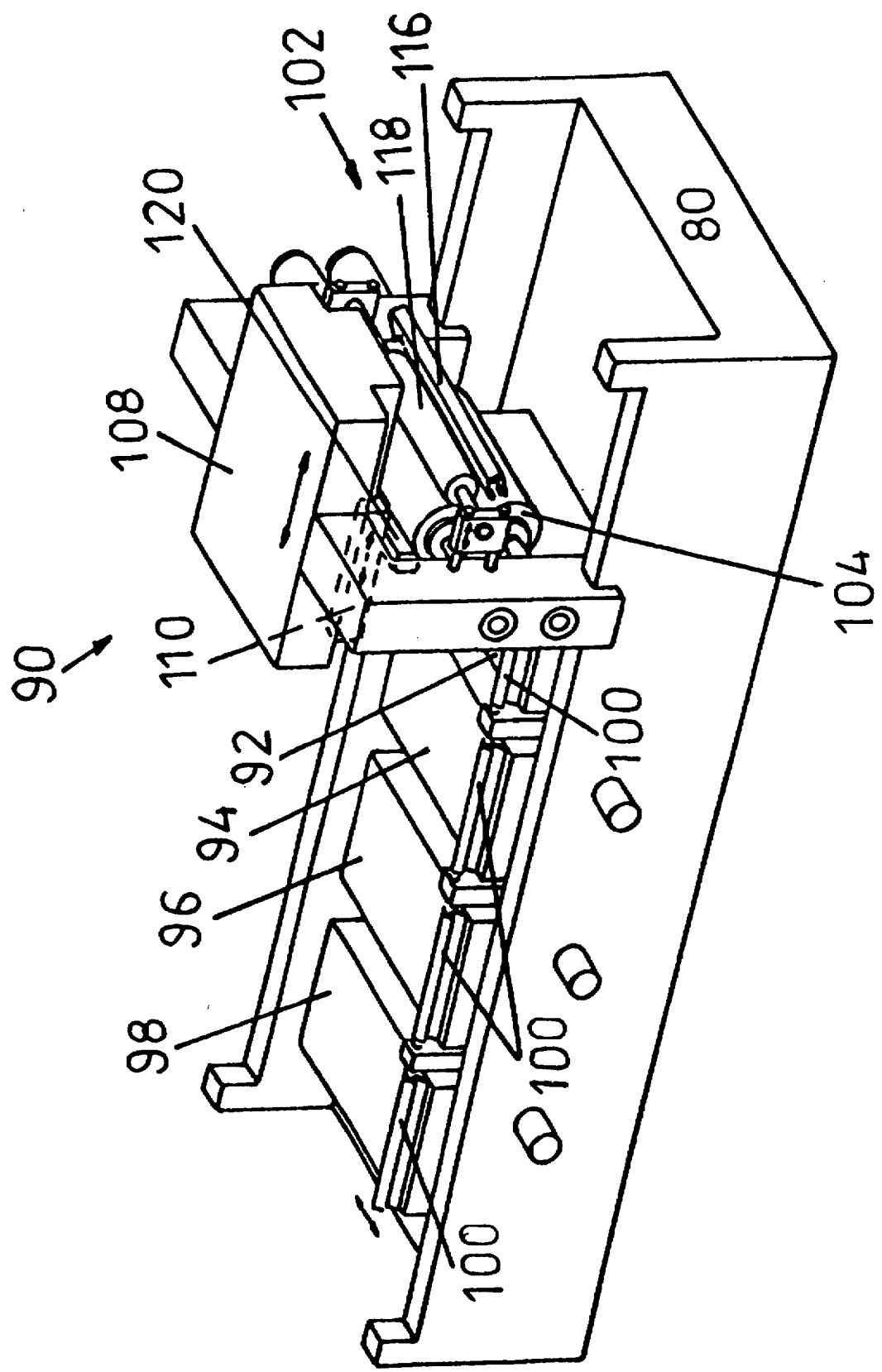
FIG. 10 is an alternative printing apparatus in accordance with the present invention.

FIG. 10 is a perspective view of an apparatus generally designated 90, which is similar to the apparatus in FIG. 6 in that it uses in-line gravure or intaglio plates. Alternatively, of course, the plates could be of the typographic or lithographic type. Apparatus 90 embodies four gravure plates 92, 94, 96, and 98. Each plate is provided with a doctor blade 100 and a source (not shown) of the particular colored ink required for its pattern. In operation, a supply of an appropriate ink will be applied to each plate. The ink pattern is formed by moving doctor blade 100 across the plate.

Apparatus 90 further embodies an assembly 102, which includes a transfer roll 104 and a collector roll 106. Collector roll 106 is positioned above transfer roll 104, and main slide 108 is positioned above support slide 110. The glass substrate 112 is held in a recess 114 on the underside of slide 110 by a vacuum chuck.

Figure 11:
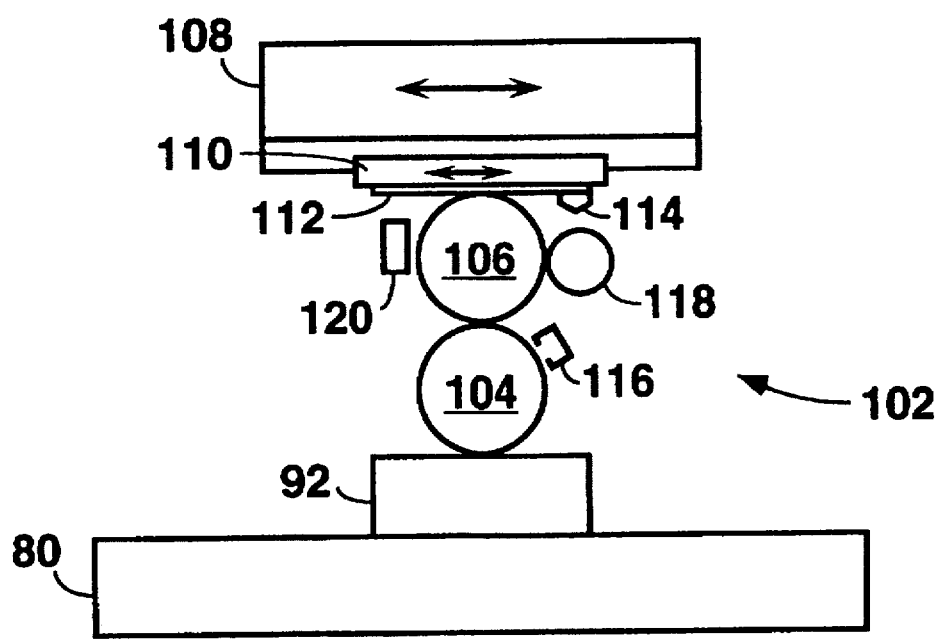
FIG. 11 is a partial side view of the printing apparatus in FIG. 10.

As best illustrated in FIG. 11, apparatus 90 further embodies a radiation source 116, a cleaner roll 118 and an inspection unit 120. As explained earlier, the ability to inspect the color filter prior to printing, and the provision of a simple means of cleaning a defective pattern from a roll without printing, are important advantages of the invention.

The operation of apparatus 90, and particularly assembly 102, is essentially similar to that of apparatus 50. However, the arrangement of components is reversed. Thus, assembly 102 moves in conjunction with main slide 108 and glass substrate 112 to visit each of plates 92–98 and receive a pattern therefrom. Each ink pattern is cured to a tacky state and transferred to collector roll 106 before transfer roll 104 proceeds to the next plate. After each individual pattern is collected on collector roll 106, the complete color filter pattern is then inspected by unit 120. It is then either transferred in total to glass substrate 112 or removed by cleaner roll 118.

FIG. 11 is a partial side view of assembly 102 of FIG. 10. Doctor blade 100 is removed to better illustrate the operation. FIG. 11 shows the arrangement of assembly 102 as transfer roll 104 visits plate 92 to receive an ink pattern for transfer to collector roll 106. The operation is repeated as assembly 102 moves from plate to plate. This permits transfer roll 104 to pick up the ink pattern from each plate and transfer it to collector roll 106.

It will be observed that operation of apparatus 90, as depicted in FIGS. 10 and 11, embodies a single forward motion of roll pair 104 and 106 to accomplish all of the required functions.

Although the invention has been described in detail for the purpose of illustration, it is understood that such detail is solely for that purpose and variations can be made therein by those skilled in the art without departing from the spirit and scope of the invention which is defined by the following claims.

For example, the transfer or planarizing layer 9 discussed above with respect to the apparatus described in FIGS. 3–7 could also easily be employed in the apparatus described in FIGS. 8 and 10.

In addition, the black matrix pattern is especially adaptable to being produced using different deposition techniques. Thus, while such a process would make registration more difficult, the black matrix layer may be deposited on the substrate in a separate deposition operation, after which the remainder of the color filter component (the red, green and blue color dots) can be applied using printing techniques. For example, the black matrix layer may be deposited using vapor deposition and photolithographic techniques, followed by deposition of the color dots using the printing techniques described herein. Alternatively, the black matrix pattern may be deposited onto a transfer layer using a different technique. For example, the black matrix applicating station may be disposed around the collector roll 20 in a manner similar to the transfer layer applicating station. The black matrix applicator may be an entirely different deposition technique, such as, for example, sublimation transfer, magnetography, laser marking, or electrophotographic techniques. It is preferable to cure the black matrix pattern prior to receiving the color patterns, in which case a curing roll may be appropriately located and utilized as desired.

What is claimed is:

1. A method of making a color filter for a flat panel display comprising:

contacting a collector roll with a plurality of pattern plates seriatim, said collector roll having an axis which is aligned at least substantially vertical, each pattern plate having a different colored ink thereon, to deposit a multicolored ink pattern on said collector roll device; and transferring said multicolored ink pattern onto a substrate in a single deposition step to form a color filter array.

2. The method of claim 1, wherein said contacting step comprises contacting a collector roll with said pattern plates.

3. The method of claim 2, wherein said pattern plates in said contacting step are flat.

4. The method of claim 3, wherein the collector roll is cylindrical.

5. The method of claim 3, further comprising:

providing a table having said pattern plates arranged in substantially a straight line; and moving said collector roll over said pattern plates seriatim.

6. The method of claim 3, wherein said collector roll is a conical collector roll, and further comprising:

moving said collector roll in a circular path over a plurality of recessed pattern plates seriatim.

7. The method of claim 1, wherein said pattern plates in said contacting step are flat.

8. The method of claim 1, further comprising, prior to said contacting step, depositing a transparent transfer layer onto to said collector roll; said multicolored ink pattern is deposited on the transfer layer to form a color pattern/transfer layer composite; and said composite is transferred to the substrate.

9. The method of claim 1, further comprising:

depositing a transparent transfer layer onto the collector roll prior to receiving the multicolored ink pattern; the multicolored pattern is deposited on the transfer layer to form a color pattern/transfer layer composite; and said substrate is glass, and the composite is transferred to the glass substrate to form a color filter for a liquid crystal display panel.

10. The method of claim 1, wherein said transferring step comprises transferring said multicolored ink pattern to a glass sheet to form a color filter for a liquid crystal display.

11. The method of claim 1, wherein said contacting step comprises contacting said collector roll with radiation curable ink, and said method further comprises curing said multicolored ink pattern during or after said transferring step to form a color filter for a liquid crystal display.

12. The method of claim 1, further comprising, prior to said transferring step, inspecting said multicolored pattern on said collector roll.

13. The method of claim 1, further comprising, after said transferring step, curing said multicolored ink pattern.

14. The method of claim 1, wherein said collector roll is provided with a recessed ink receiving pattern thereon, and said colored ink is deposited into said recessed pattern.

15. A method for making a color filter for a flat panel display device comprising:

providing a transparent transfer layer forming a multi-colored ink pattern on said transfer layer to form a color pattern/transfer layer composite; and transferring said composite to a substrate to form a color filter.

16. The method of claim 15, wherein said color filter in said transferring step is transferred to form a color filter for a liquid crystal display.

17. The method of claim 15, wherein said forming step comprises:

depositing a multi-colored radiation curable ink pattern on said transfer layer, and said method further comprises curing said ink pattern.

18. The method of claim 17, wherein said radiation curable ink is curable with radiation selected from the group consisting of ultraviolet and visible light.

19. The method of claim 18, wherein said ink pattern is cured during said deposition.

20. The method of claim 19, wherein said curing comprises emitting radiation through the substrate.

21. The method of claim 19, wherein said multicolored pattern is transferred from a transfer device which is capable of emitting radiation, and said curing comprises emitting radiation through said transfer device during said deposition step.

22. The method of claim 21, wherein said transfer device comprises a roll having a radiation source therein.

23. A method of making a color filter for a liquid crystal display, comprising:

depositing a multicolored thermoplastic ink pattern in one deposition step onto a transparent substrate, permanently deforming said ink pattern to a more uniform thickness during said depositing step; and increasing the viscosity of said ink pattern.

24. The method of claim 23, wherein said increasing the viscosity step comprises:

curing said ink pattern.

25. The method of claim 23, wherein the thickness uniformity of said ink pattern is increased during said deposition.

26. A method of making a color filter for a flat panel display comprising:

contacting a collector device with a plurality of pattern plates seriatim, each pattern plate having a different radiation curable colored ink thereon, to deposit a multicolored ink pattern on said collector device;

transferring said multicolored ink pattern onto a substrate in a single deposition step to form a color filter array; and curing said multicolored ink pattern during or after said transferring step to form a color filter.

* * * * *

UNITED STATES PATENT AND TRADEMARK OFFICE
CERTIFICATE OF CORRECTION

PATENT NO. : 5,701,815
DATED : December 30, 1997
INVENTOR(S) : Peter L. Bocko, et al.

It is certified that error appears in the above-identified patent and that said Letters Patent is hereby corrected as shown below:

Col. 21, line 26, "collector roll device" should be --collector roll--

Signed and Sealed this

Twenty-ninth Day of December, 1998

Attest:

BRUCE LEHMAN

Attesting Officer              Commissioner of Patents and Trademarks